(12) United States Patent
Choi et al.

(10) Patent No.: US 7,932,956 B2
(45) Date of Patent: Apr. 26, 2011

(54) DTV TRANSMITTER AND METHOD OF CODING DATA IN DTV TRANSMITTER

(75) Inventors: In Hwan Choi, Gyeonggi-do (KR); Kyung Won Kang, Seoul (KR); Hyoung Gon Lee, Seoul (KR); Sung Ryong Hong, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 1223 days.

(21) Appl. No.: 11/551,397

(22) Filed: Oct. 20, 2006

(65) Prior Publication Data

US 2007/0098108 A1     May 3, 2007

Related U.S. Application Data

(60) Provisional application No. 60/825,265, filed on Sep. 11, 2006.

(30) Foreign Application Priority Data

Oct. 20, 2005  (KR) .................. 10-2005-0099399

(51) Int. Cl.
*H04N 5/38*     (2006.01)

(52) U.S. Cl. ...................................... 348/723; 375/295
(58) Field of Classification Search .................. 348/725, 348/726, 553, 723, 724; 375/295, 365, 368
See application file for complete search history.

(56) References Cited

U.S. PATENT DOCUMENTS

| 6,529,558 B1 * | 3/2003 | Fimoff et al. ................. 375/262 |
| 2002/0186790 A1 * | 12/2002 | Choi et al. ..................... 375/321 |
| 2004/0161048 A1 * | 8/2004 | Zaleski et al. ................ 375/265 |

* cited by examiner

*Primary Examiner* — M. Lee
(74) *Attorney, Agent, or Firm* — Lee, Hong, Degerman, Kang & Waimey

(57) ABSTRACT

A DTV transmitter includes a pre-processor pre-processing supplemental data, a multiplexer multiplexing pre-processed data with main data, and a byte-symbol converter converting each data byte of the multiplexed data into a symbol. It further includes a symbol processor processing each supplemental data symbol outputted from the byte-symbol converter. It encodes one of upper and lower bits of each supplemental data symbol into first and second data bits, post-decodes the first data bit, and outputs the post-decoded data bit and the second data bit as a symbol. The DTV transmitter further includes a symbol-byte converter converting each symbol outputted from the symbol processor into a data byte.

38 Claims, 16 Drawing Sheets

Byte Expansion by null bit insertion (1 byte => 2 bytes)

Byte Expansion by null bit insertion (1 byte => 2 bytes)

Byte Expansion by bit repetition (1 byte => 2 bytes)

Byte Expansion
by null bit insertion
(1 byte => 4 bytes)

Byte Expansion
by null bit insertion
(1 byte => 4 bytes)

$g_i, h_i \in \{0,1\}$

DTV TRANSMITTER AND METHOD OF CODING DATA IN DTV TRANSMITTER

This application claims the benefit of the Korean Patent Application No. 10-2005-0099399 filed on Oct. 20, 2005, which is hereby incorporated by reference as if fully set forth herein. This application also claims the benefit of U.S. Provisional Application No. 60/825,265, filed on Sep. 11, 2006, which is hereby incorporated by reference.

BACKGROUND OF THE INVENTION

1. Field of the Invention

The present invention relates to a digital telecommunications system, and more particularly, to a DTV transmitter and method of coding data in DTV transmitter.

2. Discussion of the Related Art

The VSB (Vestigial Sideband) transmission mode, which is adopted as the standard for digital broadcasting in North America and the Republic of Korea, is a system that has been developed for the transmission of MPEG video/audio data. However, presently, the technology for processing digital signals is being developed at a vast rate, and, as a larger number of the population uses the Internet, digital electric appliances, computers, and the Internet are being integrated. Therefore, in order to meet with the various requirements of the users, a system that can add video/audio data through a digital television channel so as to transmit diverse supplemental information needs to be developed.

Some users may assume that supplemental data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the supplemental data, the data that is to be transmitted should have a low error ratio. More specifically, in case of the video/audio data, errors that are not perceived or acknowledged through the eyes or ears of the user can be ignored, since they do not cause any or much trouble. Conversely, in case of the supplemental data (e.g., program execution file, stock information, etc.), an error even in a single bit may cause a serious problem. Therefore, a system highly resistant to ghost effects and noise is required to be developed.

The supplemental data are generally transmitted by a time-division method through the same channel as the MPEG video/audio data. However, with the advent of digital broadcasting, ATSC VSB digital television receivers that receive only MPEG video/audio data are already supplied to the market. Therefore, the supplemental data that are transmitted through the same channel as the MPEG video/audio data should not influence the conventional ATSC VSB receivers that are provided in the market. In other words, this may be defined as ATSC VSB compatibility, and the supplemental data broadcast system should be compatible with the ATSC VSB system. Herein, the supplemental data may also be referred to as enhanced data or E-VSB data. Furthermore, in a poor channel environment, the receiving quality of the conventional ATSC VSB receiving system may be deteriorated. More specifically, resistance to changes in channels and noise is more highly requited when using portable and/or mobile receivers.

SUMMARY OF THE INVENTION

Accordingly, the present invention is directed to a digital broadcasting system and method of processing data that substantially obviates one or more problems due to limitations and disadvantages of the related art.

An object of the present invention is to provide a digital television system that is suitable for transmitting supplemental data and that is highly resistant to noise.

Another object of the present invention is to provide a digital broadcasting system and method of processing data that can insert known data in a specific are of the supplemental data and transmitting the data to a DTV transmitter/receiver, thereby enhancing the receiving quality of the digital television system.

A further object of the present invention is to provide a device and method for efficiently processing symbols when transmitting/receiving enhanced data including the known data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) receiver includes a pre-processor, a multiplexer, a byte-symbol converter, a symbol processor, and a symbol-byte converter.

The pre-processor pre-processes supplemental data by coding the supplemental data for forward error correction (FEC) and expands the FEC-coded supplemental data. The multiplexer multiplexes supplemental data packets including the pre-processed supplemental data with main data packets including main data. The byte-symbol converter converts each data byte of the multiplexed data packets into a symbol, and the symbol processor processes each supplemental data symbol outputted from the byte-symbol converter.

In one example, the symbol processor encodes an upper bit of each supplemental data symbol into first and second bits, post-decodes the first bit, and outputs the post-decoded first bit and the second bit as a symbol. In another example, the symbol processor encodes a lower bit of each supplemental data symbol into first and second bits, post-decodes the first bit, and outputs the post-decoded first bit and the second bit as a symbol.

The symbol processor bypasses each main data symbol and each symbol corresponding to an MPEG header byte or an RS parity byte added into the supplemental data packets. The symbol-byte converter converts each symbol outputted from the symbol processor into a data byte.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It should be noted that, in order to avoid any confusion that may occur during the description of the present invention, only the parts necessary for the understanding of the present invention will be described in detail and the remaining parts may be omitted for simplicity.

Additionally, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the enhanced data may either consist of data including information such as program execution files, stock information, and so on, or consist of video/audio data. Additionally, the known data refer to data already known based upon a pre-determined agreement between the transmitter and the receiver. Furthermore, the main data consist of data that can be received from the conventional receiving system, wherein the main data include video/audio data. The present invention relates to inserting known data known by the transmitter/receiver in a specific area of an enhanced data packet and transmitting the processed data packet, thereby enhancing the receiving performance of the receiving system. Most particularly, the present invention relates to multiplexing the enhanced data including the known data and the main data in packet units, thereby bypassing the encoding of the main data and the known data, and performing additional encoding of only the enhanced data when encoding the multiplexed data in a symbol domain.

Figure 1:
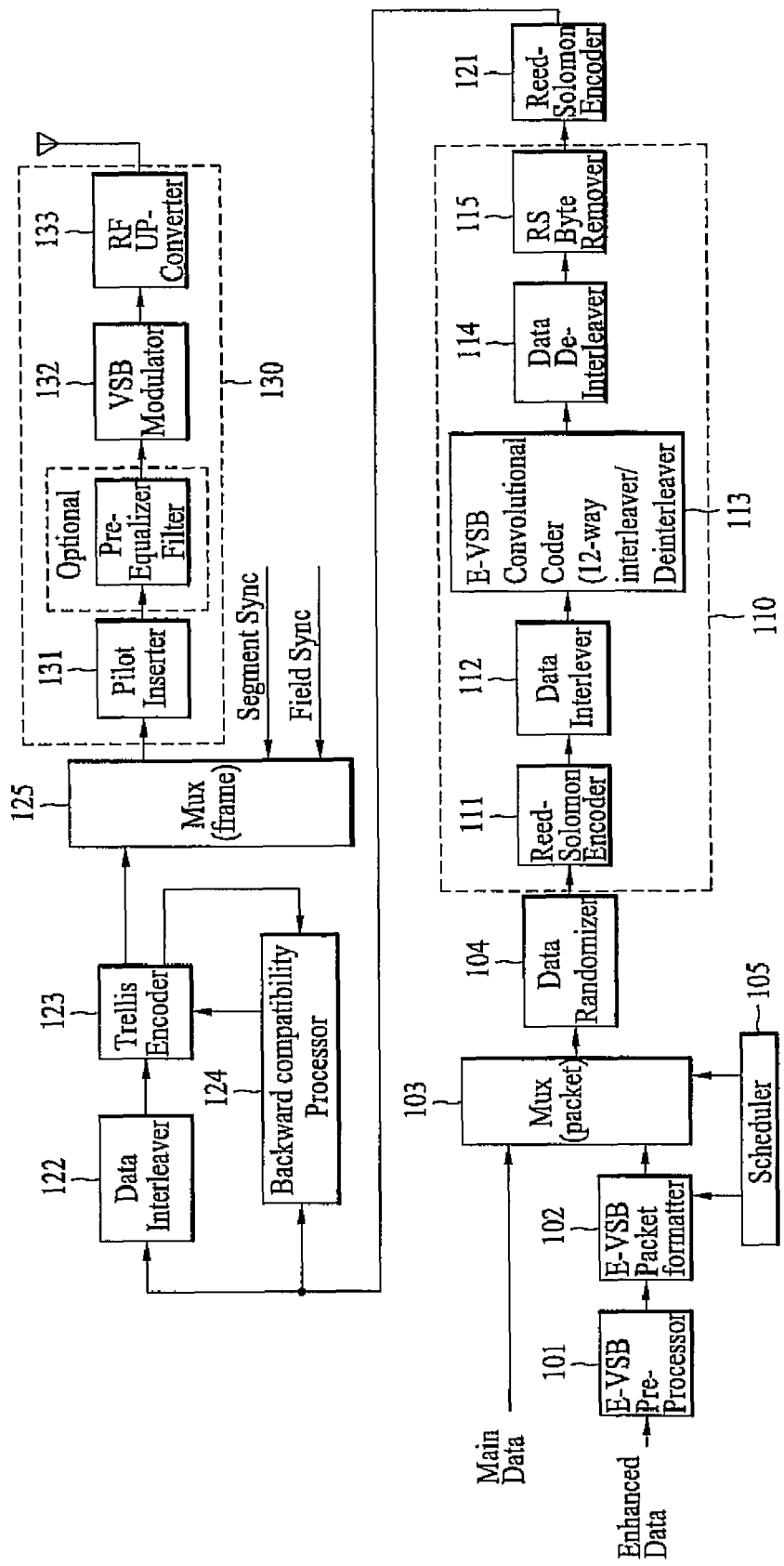
FIG. 1 illustrates a block view showing a structure of an digital broadcast transmitting system according to the present invention.

FIG. 1 illustrates a block view showing an overall structure of a digital television receiving system according to the present invention. The digital television receiving system includes an E-VSB pre-processor 101, an E-VSB packet formatter 102, a packet multiplexer 103, a data randomizer 104, a scheduler 105, an E-VSB post-processor 110, a Reed-Solomon (RS) encoder 121, a data interleaver 122, a trellis encoder 123, a backward compatibility processor 124, a frame multiplexer 125, and a transmitter 130.

In the present invention having the above-described structure, a main data packet is outputted to the packet multiplexer 103, and enhanced data are outputted to the E-VSB pre-processor 101. The E-VSB pre-processor 101 pre-processes the enhanced data, such as encoding additional error correction, interleaving, byte expansion, and so on, and then outputs the pre-processed enhanced data to the E-VSB packet formatter 102.

Based upon the control of the scheduler 105, the E-VSB packet formatter 102 multiplexes the pre-processed enhanced data and the pre-defined known data, thereby configuring a group. The data within the group are then divided into 184-byte unit enhanced data packets, and a 4-byte MPEG header is added to the beginning of the enhanced data packet, thereby outputting a 188-byte enhanced data packet (i.e., a MPEG compatibility packet). In other words, one enhanced data packet group includes a plurality of consecutive enhanced data packets. The output of the E-VSB packet formatter 102 is inputted to the packet multiplexer 103. The packet multiplexer 103 time-division multiplexes the main data packet and the enhanced data packet group in transport stream (TS) packet units and outputs the multiplexed TS packet in accordance with the control of the scheduler 105.

More specifically, the scheduler 105 generates and outputs a control signal so that the packet formatter 102 can multiplex the enhanced data and the known data. The scheduler 105 also generates and outputs a control signal so that the packet multiplexer 13 can multiplex the main data packet and the enhanced data packet group. Accordingly, the packet multiplexer 103 receives the control signal, thereby multiplexing and outputting the main data packet and the enhanced data packet group to TS packet units.

According to an embodiment of the present invention, the known data and the enhanced data are multiplexed by the E-VSB packet formatter 102. Additionally, according to another embodiment of the present invention, the E-VSB packet formatter 102 decides a known data place holder in which known data are to be inserted, and then the E-VSB packet formatter 102 inserts null data in the decided known data place holder. Thereafter, the inserted null data may be multiplexed with the enhanced data pre-processed by the E-VSB pre-processor 101. The actual known data are generated in a later process, which then replace the null data inserted in the known data place holder.

Meanwhile, the output data of the packet multiplexer 103 are inputted to the data randomizer 104. The data are then randomized and provided to the E-VSB post-processor 110. Herein, the E-VSB post-processor 110 includes a RS encoder 111, a data interleaver 112, an E-VSB convolution encoder 113, a data deinterleaver 114, and a RS byte remover 115. The RS encoder 111 RS encodes the output data of the data randomizer 104, so as to add a set of 20-byte parity data to the output data. Thereafter, the parity-added data pass through the data interleaver 112 so as to be provided to the E-VSB convolutional encoder 113.

The E-VSB convolutional encoder 113 converts the inputted byte to a symbol, thereby convolution-coding only the enhanced data symbol. Then, the E-VSB convolutional encoder 113 converts the symbols back to a byte which is then outputted. More specifically, when the output of the data interleaver 112 corresponds to the main data, or when the output of the data interleaver 112 corresponds to the known data inserted in the enhanced data packet, the E-VSB convolutional encoder 113 outputs the data without any modification. Additionally, the E-VSB convolutional encoder 113 also outputs the MPEG header byte added by the E-VSB packet formatter 102 or the RS parity byte added to the enhanced data packet by the RS encoder 111 without any modification. The output of the E-VSB convolutional encoder 113 is deinterleaved from the data deinterleaver 114 and then outputted to the RS parity remover 114, thereby removing the 20-byte parity data. This operation is performed in order to recalculate the parity since the original (or initial) data have been modified by the E-VSB convolutional encoder 113. The output of the RS byte remover 115 is then outputted to the RS encoder 121.

The RS encoder 121 RS-codes the input data so as to add a 20-byte parity thereto. Then, the RS encoder 121 outputs the parity added input data to the data interleaver 122. The data interleaver 122 interleaves the input data and outputs the interleaved data to the trellis encoder 123. The trellis encoder 123 encodes and outputs the inputted 2 bits to 3 bits. Thereafter, the encoded 3 bits are outputted to the frame multiplexer 125. If the output data of the trellis encoder 123 are to be the known data defined by the transmitter/receiver, the memory within the trellis encoder 123 corresponding to the known data inserted in the E-VSB packet is required to be initialized. At this point, since the initialization on the memory is performed by a new set of data and not by the input data, a new set of RS parity should be generated so as to replace the original parity data. This operation is performed by the backward compatibility processor 124.

The output of the trellis encoder 123 is inputted to the frame multiplexer 125. The frame multiplexer 125 inserts a field synchronization signal and a segment synchronization signal to the output of the trellis encoder 123 and, then, outputs the processed data to the transmitter 130. Herein, the transmitter 130 includes a pilot inserter 131, a VSB modulator 133, and a radio frequency (RF) converter 134. With reference to FIG. 1, a detailed description of the transmitter 130 will be omitted for simplicity. Hereinafter, a detailed description of the E-VSB convolutional encoder 113 will now described in detail. In order to simplify the distinction of each symbol, M represents the main data symbol, E signifies the enhanced data symbol, and T represents the known data symbol.

Figure 2:
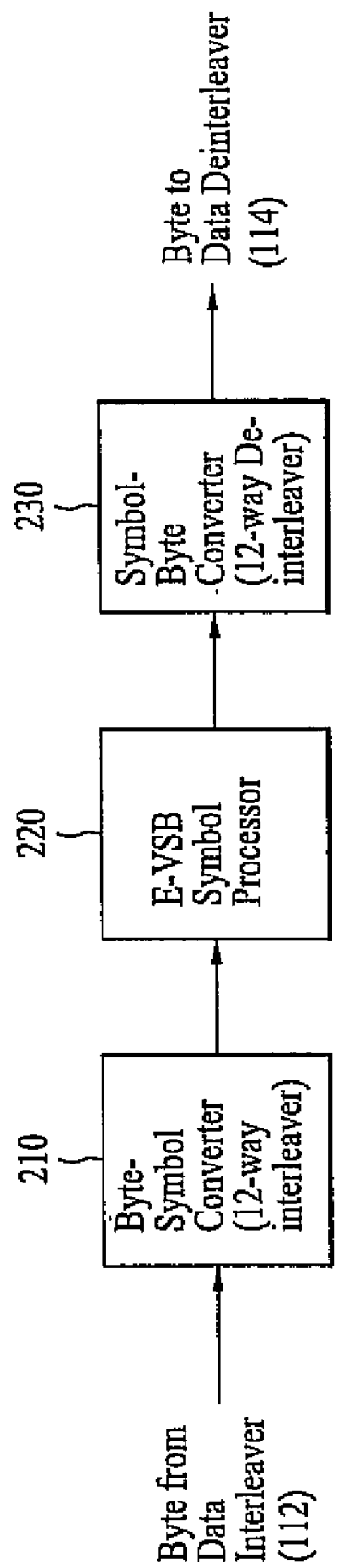
FIG. 2 illustrates an E-VSB convolutional encoder of FIG. 1 according to an embodiment of the present invention.

FIG. 2 illustrates a detailed block view showing an E-VSB convolutional encoder according to an embodiment of the present invention. The E-VSB convolutional encoder includes a byte-symbol converter (or 12-way interleaver) 210, an E-VSB symbol processor 220, and a symbol-byte converter (or 12-way deinterleaver) 230. The byte-symbol converter 210 converts the byte, which is interleaved and outputted from the data interleaver 112, to symbols and outputs the symbols to the E-VSB symbol processor 220. At this point, one byte is converted to 4 symbols, and one symbol is configured of 2 bits.

The E-VSB symbol processor 220 performs a ½-rate encoding only on the enhanced data symbol. On the other hand, the E-VSB symbol processor 220 directly outputs the main data symbol and the known data symbol without any modification. In addition, even when the MPEG header byte inserted in the enhanced data packet by the E-VSB packet formatter 102 and the RS parity byte added to the enhanced data packet by the RS encoder 111 are converted to symbols, the E-VSB symbol processor 220 directly outputs the symbols without any data modification. The output symbols of the E-VSB symbol processor 220 are converted to a byte by the symbol-byte converter 230 and then outputted. The byte-symbol converter 210 is identical to the byte-symbol converter (not shown) of the trellis encoder 123, and the symbol-byte converter 230 performs inverse operation of the byte-symbol converter 210.

Figure 3:
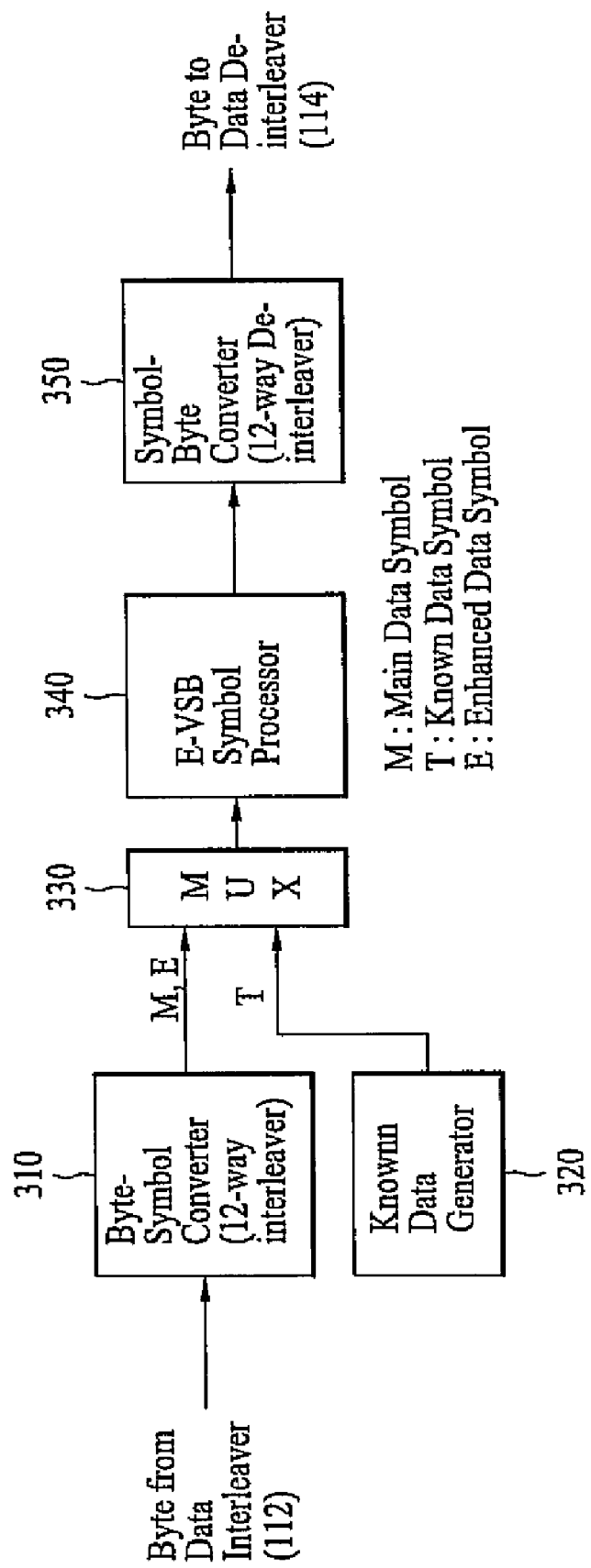
FIG. 3 illustrates an E-VSB convolutional encoder of FIG. 1 according to another embodiment of the present invention.

FIG. 3 illustrates a detailed block view showing an E-VSB convolutional encoder according to another embodiment of the present invention. In comparison with the E-VSB symbol processor of FIG. 2, the E-VSB symbol processor shown in FIG. 3 further includes a known data generator 320 and a multiplexer 330. Herein, the operations of the byte-symbol converter 310, the E-VSB symbol processor 340, and the symbol-byte converter 350 shown in FIG. 3 are identical to those of FIG. 2. Referring to FIG. 3, when the known data inserted by the E-VSB packet formatter 102 are outputted through the byte-symbol converter 310, the E-VSB convolutional encoder replaces the outputted known data with the known data symbol generated from the symbol domain. Then, the E-VSB convolutional encoder outputs the known data symbol to E-VSB symbol processor 340. More specifically, since the known data used by the receiver are used in the symbol domain, it is more effective to create (or generate) a known data symbol sequence having the characteristics desired by the symbol domain. In this case, the known data inserted from the E-VSB packet formatter 102 act as a place holder for ensuring the place in which known data are to be inserted. In other words, the data that are inputted to the byte-symbol converter 310 correspond to a byte of the enhanced data packet having a known data place holder multiplexed thereto and the main data packet.

The data being converted to symbols from the byte-symbol converter 310 are outputted to the multiplexer 330. In addition, the known data T generated from the symbol domain are also outputted to the multiplexer 330. When the inputted symbol corresponds to a main data symbol or an enhanced data symbol, the multiplexer 330 selects the output of the byte-symbol converter 310. Alternatively, when the inputted symbol corresponds to a known data (or known data place holder) symbol, the multiplexer 330 selects the output of the known data generator 320. Thereafter, the multiplexer 330 outputs the selected symbol to the E-VSB symbol processor 340. The E-VSB symbol processor 340 performs ½-rate convolution-coding only on the enhanced data symbol E. In case of the main data symbol M and the known data symbol T, the symbols are bypassed without being coded. At this point, the E-VSB symbol processor 340 also bypasses the MPEG header byte added by the E-VSB packet formatter 102 and the RS parity byte added to the enhanced data packet by the RS encoder 111 without coding the corresponding bytes. The symbol-byte converter 350 converts the output symbols of the E-VSB symbol processor 340 to a byte. Thereafter, the newly converted byte is outputted to the data deinterleaver 114.

Figure 4A:
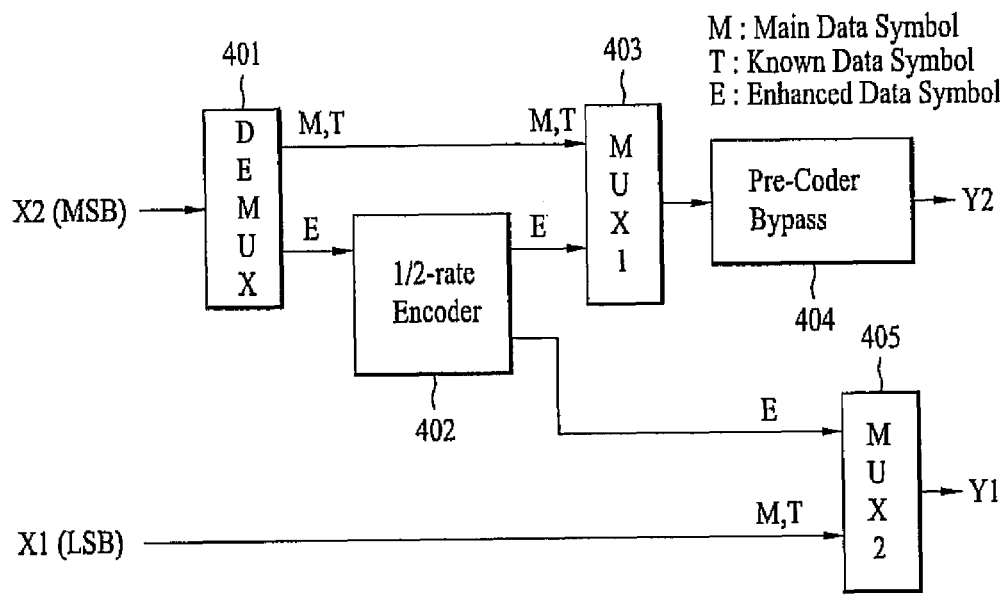
FIG. 4A illustrates an E-VSB symbol processor according to an embodiment of the present invention.
Figure 4B:
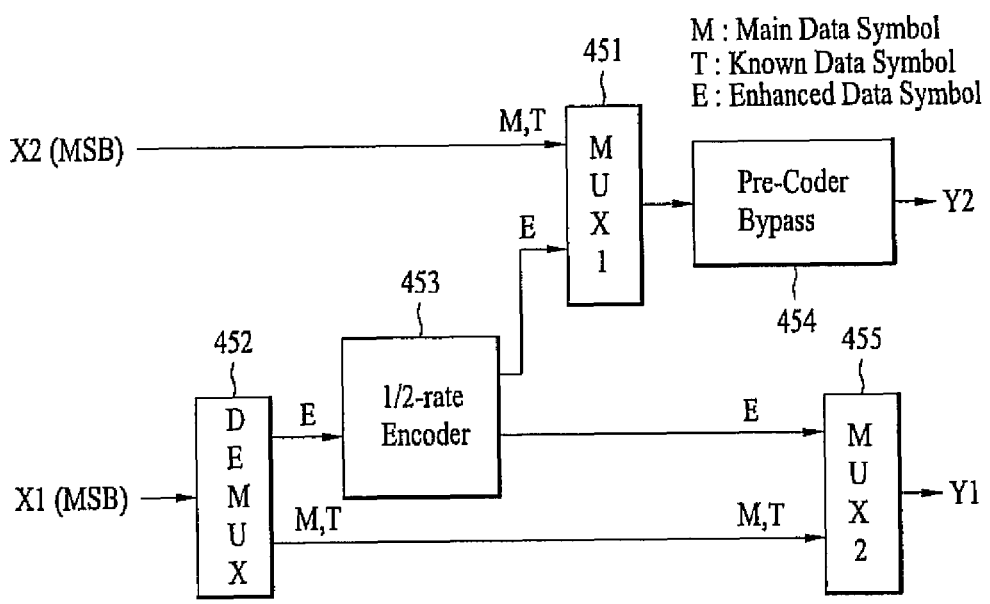
FIG. 4B illustrates an E-VSB symbol processor according to another embodiment of the present invention.

FIG. 4A and FIG. 4B illustrate examples of the E-VSB symbol processor, which may be applied to any one of the convolutional encoder of FIG. 2 and FIG. 3. The E-VSB symbol processor of FIG. 4A includes a demultiplexer 401, a ½-coding rate encoder (hereinafter referred to as a "½-rate encoder") 402, a first multiplexer 403, a second multiplexer 405, and a pre-coder bypass unit 404. Referring to FIG. 4A, X2 corresponds to the upper bit among the 2 bits of the symbol outputted from the byte-symbol converter of the convolutional encoder, and X1 corresponds to the lower bit. M represents the main data symbol, T signifies the known data symbol, and E represents the enhanced data symbol. At this point, if the MPEG header byte inserted to the enhanced data packet and the parity byte inserted by the RS encoder are converted to symbols, the inserted bytes are processed as the main data symbol.

In the E-VSB symbol processor of FIG. 4A, when the input bit X2 is an upper bit of the main data symbol, or when the input bit X2 is an upper bit of the known data symbol, the demultiplexer 401 outputs the input bit X2 to the first multiplexer 403. And, when the input bit X2 is an upper bit of the enhanced data symbol, the demultiplexer 401 outputs the input bit X2 to the ½-rate encoder 402. The ½-rate encoder 402 only operates on the enhanced data symbol, thereby coding the X2 bit of the enhanced data symbol so as to output two bits. Herein, among the two output bits, one bit is outputted to the pre-coder bypass unit 404 through the first multiplexer 403, and the other bit is outputted to the second multiplexer 405.

When the input symbol is a main data symbol M or a known data symbol T, the first multiplexer 403 selects the output of the demultiplexer 401. And, when the input symbol is an enhanced data symbol E, the first multiplexer 403 selects one of the output bits of the ½-rate encoder 402. Thereafter, the first multiplexer 403 outputs the selected output bit to the pre-coder bypass unit 404. When the input data correspond to the enhanced data symbol E, the pre-coder bypass unit 404 operates and outputs the input data so as to enable the data to bypass the pre-coder in the trellis encoder during a later process. On the other hand, when the input data correspond to the main data symbol M or the known data symbol T, the data are directly outputted without an modification. The operation of the pre-coder bypass unit 404 will be described in detail in a later process.

When the input symbol corresponds to the enhanced data symbol E, the second multiplexer 405 selects and outputs the output bit of the ½-rate encoder 402 instead of the input bit X1. Conversely, when the input symbol corresponds to the main data symbol M or the known data symbol T, the second multiplexer 405 selects and outputs the input bit X1. Accordingly, among the two input bits of the enhanced data symbol, only the upper bit X2 is coded so as to be outputted as two bits, and the lower bit X1 is deleted (or discarded).

FIG. 4B illustrates another example of the E-VSB symbol processor. Although the E-VSB symbol processor shown in FIG. 4B is similar to that shown in FIG. 4A, only the lower bit X1 of the enhanced data symbol is coded so as to be outputted as two bits, and the upper bit X2 is deleted (or discarded). Accordingly, the upper bit X2 is outputted to a first multiplexer 451, and the lower bit X1 is outputted to a demultiplexer 452. When the inputted lower bit X1 corresponds to the enhanced data, the demultiplexer 452 outputs the lower bit X1 to a ½-rate encoder 453. Conversely, when the inputted lower bit X1 corresponds to the main data or the known data, the demultiplexer 452 outputs the lower bit X1 to a second multiplexer 455. The ½-rate encoder 453 performs ½-rate coding on the enhanced data bit outputted from the demultiplexer 452, thereby generating (or creating) 2 bits. Herein, one of the bits is outputted to the first multiplexer 451, and the other bit is outputted to the second multiplexer 455.

When the input data correspond to the main data or the known data, the first multiplexer 451 selects the upper bit X2. And, when the input data correspond to the enhanced data, the first multiplexer 451 selects the output bit of the ½-rate encoder 453 and outputs the selected bit to the pre-coder bypass unit 454. When the input data correspond to the enhanced data, the pre-coder bypass unit 454 operates the input data, so that the data bypass the pre-coder of the trellis encoder in a later process, and outputs the operated data. On the other hand, if the input data correspond to the main data or the known data, the pre-coder bypass unit 454 directly outputs the data without modification. When the input data correspond to the enhanced data, the second multiplexer 455 selects the other output bit of the ½-rate encoder 453. Conversely, when the input data correspond to the main data or the known data, the second multiplexer 455 selects and outputs the output bit of the demultiplexer 452. Accordingly, among the two input bits of the enhanced data symbol, only the lower bit X1 is coded so as to be outputted as two bits, and the upper bit X2 is deleted (or discarded).

Figure 5A:
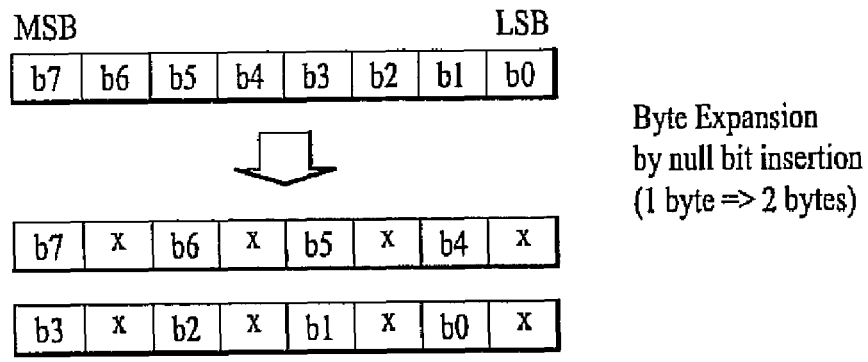
FIG. 5A to FIG. 5C illustrate examples of expanding one enhanced data byte to two bytes according to the present invention.
Figure 5B:
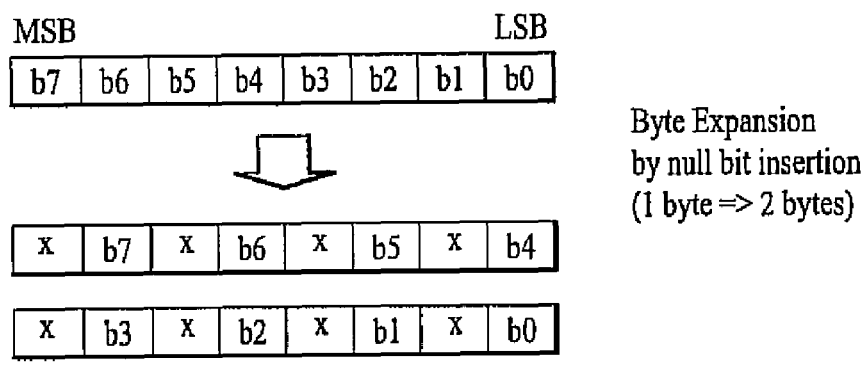
Figure 5C:
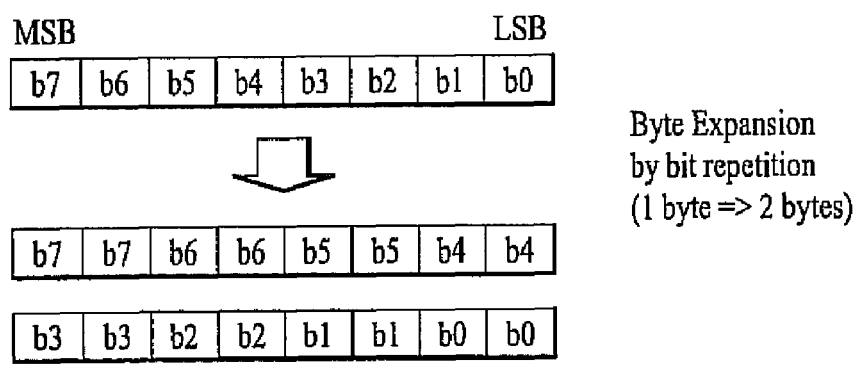
Figure 6A:
FIG. 6A to FIG. 6C illustrate examples of expanding one enhanced data byte to four bytes according to the present invention.
Figure 6B:
Figure 6C:
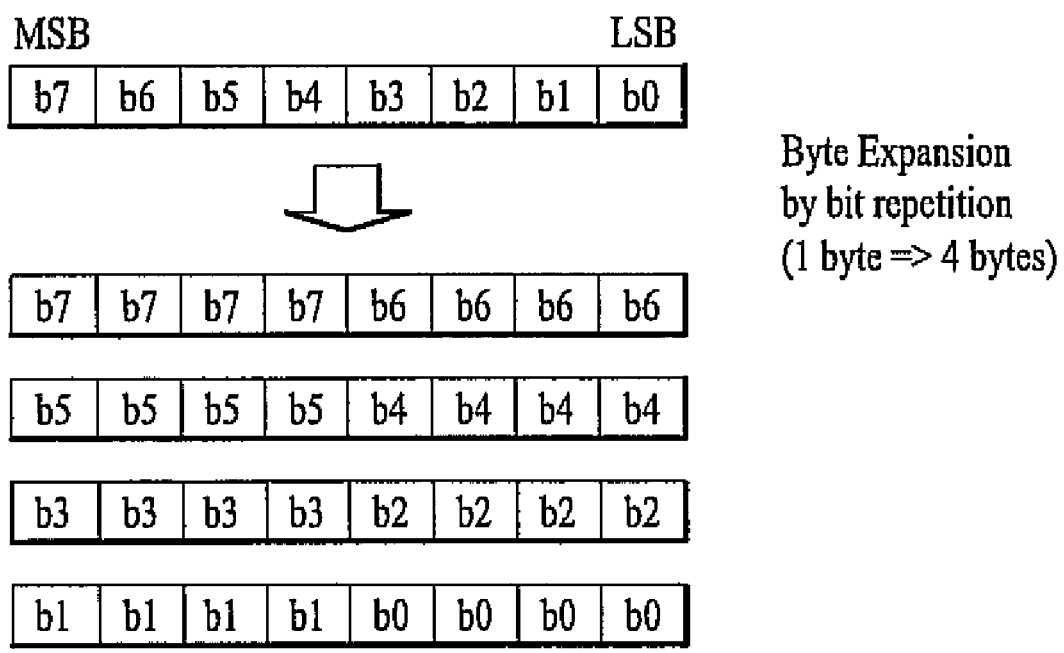

Meanwhile, the E-VSB pre-processor 101 of FIG. 1 performs pre-processing steps such as additional error correction encoding, byte expansion, and so on, on the enhanced data. At this point, the processing method of the E-VSB symbol processor may vary in accordance with the byte expansion method of the E-VSB pre-processor 101. Examples of the same are shown in FIG. 5A to FIG. 5C and also in FIG. 6A to FIG. 6C. Herein, FIG. 5A to FIG. 5C illustrate examples of expanding one enhanced data byte to two bytes according to the present invention. And, FIG. 6A to FIG. 6C illustrate examples of expanding one enhanced data byte to four bytes according to the present invention. FIG. 5A and FIG. 6A are most effective when applied to the E-VSB symbol processor of FIG. 4A. Alternatively, FIG. 5B and FIG. 6B are most effective when applied to the E-VSB symbol processor of FIG. 4B. FIG. 5C and FIG. 6C may be applied in any one of FIG. 4A and FIG. 4B. The byte expansion includes the method of inserting null data bits between each bit and the method of repeating each bit.

FIG. 5A illustrates an example of the E-VSB pre-processor 101 expanding one enhanced data byte to two bytes when using the E-VSB symbol processor shown in FIG. 4A. In the E-VSB symbol processor of FIG. 4A, only the upper bit of the enhanced data symbol is used and the lower bit is discarded (or deleted). Therefore, as shown in FIG. 5A, the E-VSB pre-processor 101 inserts a null data bit x after each bit for one input byte, thereby outputting two bytes. In a later process, the outputted byte is converted to a 2-bit unit symbol by the byte-symbol converter and inputted to the E-VSB symbol processor of FIG. 4A. At this point, the upper bit X2 of the input symbol includes information, and the lower bit X1 is a null data bit. Herein, the lower bit X1 is replaced with the output bit of the ½-rate encoder 402 by the second multiplexer 405 of FIG. 4A.

FIG. 5B an example of the E-VSB pre-processor 101 expanding one enhanced data byte to two bytes when using the E-VSB symbol processor shown in FIG. 4B. In the E-VSB symbol processor of FIG. 4B, only the lower bit of the enhanced data symbol is used and the upper bit is discarded (or deleted). Therefore, as shown in FIG. 5B, the E-VSB pre-processor 101 inserts a null data bit x before each bit for one input byte, thereby outputting two bytes. In a later process, the outputted byte is converted to a 2-bit unit symbol by the byte-symbol converter and inputted to the E-VSB symbol processor of FIG. 4B. At this point, the upper bit X2 is a null data bit, and the lower bit X1 of the input symbol includes information. Herein, the upper bit X2 is replaced with the output bit of the ½-rate encoder 453 by the first multiplexer 451 of FIG. 4B.

FIG. 5C illustrates yet another example of expanding one enhanced data byte to two bytes that can be applied to the E-VSB symbol processor of both FIG. 4A and FIG. 4B. The null data bit shown in FIG. 5A and FIG. 5B may be given an arbitrary value. Therefore, as shown in FIG. 5C, each bit for one input byte is repeated one time to be expanded to 2 bytes. This expansion method can be applied to the E-VSB symbol processor of both FIG. 4A and FIG. 4B.

FIG. 6A illustrates an example of the E-VSB pre-processor 101 expanding one enhanced data byte to four bytes when using the E-VSB symbol processor shown in FIG. 4A. In the E-VSB symbol processor of FIG. 4A, only the upper bit of the enhanced data symbol is used and the lower bit is discarded (or deleted). Therefore, as shown in FIG. 6A, the E-VSB pre-processor 101 repeats each bit for one input byte so as to create 2 bits. Then, the E-VSB pre-processor 101 inserts a null data bit x after each bit including the repeated bits, thereby outputting four bytes. More specifically, the amount of data in the enhanced data is expanded to 4 times its initial size. The outputted byte is converted to a 2-bit unit symbol by the byte-symbol converter and inputted to the E-VSB symbol processor of FIG. 4A. At this point, the upper bit X2 of the input symbol includes information, and the lower bit X1 is a null data bit. Herein, the lower bit X1 is replaced with the output bit of the ½-rate encoder 402 by the second multiplexer 405 of FIG. 4A.

FIG. 6B illustrates an example of the E-VSB pre-processor 101 expanding one enhanced data byte to four bytes when using the E-VSB symbol processor shown in FIG. 4B. In the E-VSB symbol processor of FIG. 4B, only the lower bit of the enhanced data symbol is used and the upper bit is discarded (or deleted). Therefore, as shown in FIG. 6B, the E-VSB pre-processor 101 repeats each bit for one input byte so as to create 2 bits. Then, the E-VSB pre-processor 101 inserts a null data bit x before each bit including the repeated bits, thereby outputting four bytes. The outputted byte is converted to a 2-bit unit symbol by the byte-symbol converter and inputted to the E-VSB symbol processor of FIG. 4B. At this point, the lower bit X1 of the input symbol includes information, and the upper bit X2 is a null data bit. Herein, the upper bit X2 is replaced with the output bit of the ½-rate encoder 453 by the first multiplexer 451 of FIG. 4B.

FIG. 6C illustrates yet another example of expanding one enhanced data byte to four bytes that can be applied to the E-VSB symbol processor of both FIG. 4A and FIG. 4B. The null data bit shown in FIG. 6A and FIG. 6B may be given an arbitrary value. Therefore, as shown in FIG. 6C, each bit for one input byte is repeated four times to be expanded to 2 bytes. This expansion method can be applied to the E-VSB symbol processor of both FIG. 4A and FIG. 4B. By expanding the data byte as shown in FIG. 6A to FIG. 5C, each bit is coded with a ½-coding rate twice by the E-VSB symbol processor, which results in a coding rate of ¼ (hereinafter referred to as a ¼-coding rate) of the bits.

Hereinafter, FIG. 7 to FIG. 10 illustrate detailed embodiments of the ½-rate encoder of the E-VSB symbol processor according to the present invention. FIG. 7A to FIG. 7C illustrate different examples of a ½-rate systematic convolutional encoder according to the present invention. More specifically, FIG. 7A illustrates a feedback type ½-rate systematic convolutional encoder having M number of memories. As shown in FIG. 7A, an input bit u is outputted directly as output bit d2 without being changed. In other words, the input bit u including information is outputted directly as output upper bit d2 and is simultaneously encoded, thereby being outputted as output lower bit d1. As described above, a convolutional encoder having the input bit directly outputted as one of the output bits is referred to as a "systematic convolutional encoder".

Figure 7A:
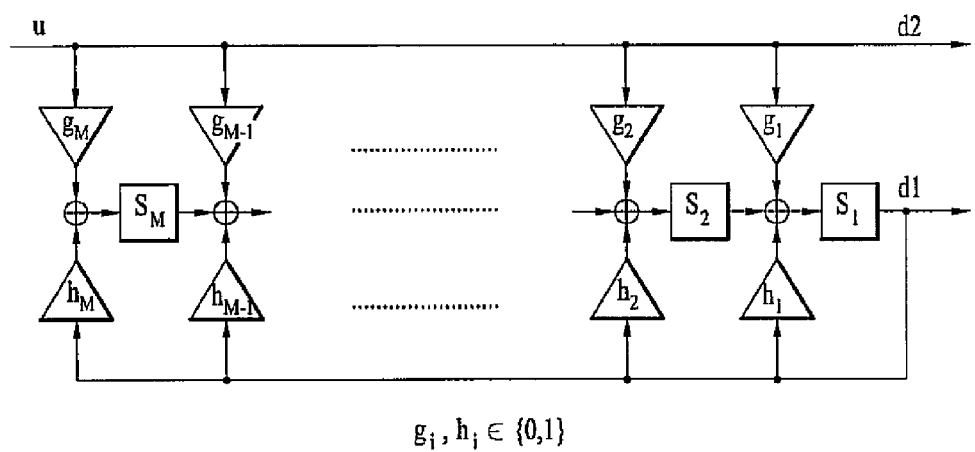
FIG. 7A to FIG. 7C illustrate block views of a systematic convolutional encoder according to an embodiment of the present invention.

The ½-rate systematic convolutional encoder of FIG. 7A is configured of M number of structures each including a multiplier $h_1$, another multiplier $g_1$, a modulo adder, and a memory $S_1$. The multiplier $h_1$ receives a fed-back value of the output lower bit d1 (i.e., a fed-back value of a memory $S_1$ of the final end) and multiplies the fed-back value by a predetermined value. The other multiplier $g_1$ receives the input bit u and multiplies the received input bit u by a predetermined value. The modulo adder adds the output of the two multipliers $h_1$ and $g_1$ and the output of a register in a previous end. The memory $S_1$ temporarily stores the output of the modulo adder. Herein, each of the M number of the above-described structure is provided in series, and an input bit u is outputted as two output bits d2 and d1. Also, the predetermined values multiplied in each multiplier (i.e., the coefficients $g_i$ and $h_i$) is equal to '0' or '1', wherein i=1, 2, 3, . . . , M. The input of each memory starting from $S_1$ to $S_{M-1}$ may be provided by having the input bit u and the output of the memory $S_1$ pass through each multiplier, respectively, which are then modulo added with the value of a previous (left) memory. Meanwhile, in case of the memory $S_M$, the input bit u and the output of the memory $S_1$ respectively pass through each multiplier $g_M$ and $h_M$, which are then inputted after being modulo added. The characteristic of the convolutional encoder of FIG. 7A is that the value of the very last memory $S_1$ is directly outputted as the lower bit d1. Simultaneously, this value may be fed-back as the input of the remaining memories.

Figure 7B:
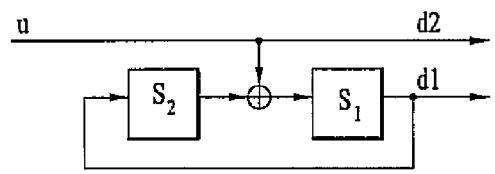
Figure 7C:
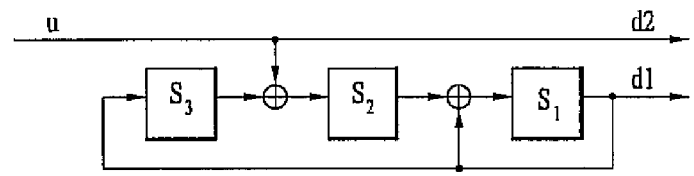

FIG. 7B illustrates an example of the ½-rate systematic convolutional encoder of FIG. 7A having two memories. And, FIG. 7C illustrates an example of the ½-rate systematic convolutional encoder of FIG. 7A having three memories. More specifically, FIG. 7B illustrates a block view of the ½-rate systematic convolutional encoder having two memories, which includes a memory $S_2$, an adder, and a memory $S_1$. The memory $S_2$ receives and temporarily stores the fed-back lower bit d1, which is convolution-coded. The adder adds the output of the memory $S_2$ and the input bit u. And, the memory $S_1$ temporarily stores the output of the adder and outputs the temporarily stored output as the lower bit d1, which is convolution-coded. More specifically, FIG. 7B is equivalent to when only the coefficients of the multipliers $g_1$, and $h_2$ of FIG. 7A are equal to '1', and when the coefficients of the remaining multipliers are equal to '0'.

FIG. 7C illustrates a block view of the ½-rate systematic convolutional encoder having three memories, which includes a memory $S_3$, a first adder, a memory $S_2$, a second adder, and a memory $S_1$. Herein, the memory $S_3$ receives and temporarily stores the fed-back lower bit d1, which is convolution-coded. The first adder adds the output of the memory $S_3$ and the input bit u. The memory $S_2$ temporarily stores the output of the first adder. The second adder adds the output of the memory $S_2$ and the fed-back lower bit d1, which is convolution-coded. The memory $S_1$ temporarily stores the output of the second adder and outputs the temporarily stored output as the lower bit d1, which is convolution-coded. More specifically, FIG. 7C is equivalent to when only the coefficients of the multipliers $g_2$, $h_1$, and $h_3$ of FIG. 7A are equal to '1', and when the coefficients of the remaining multipliers are equal to '0'.

Figure 8A:
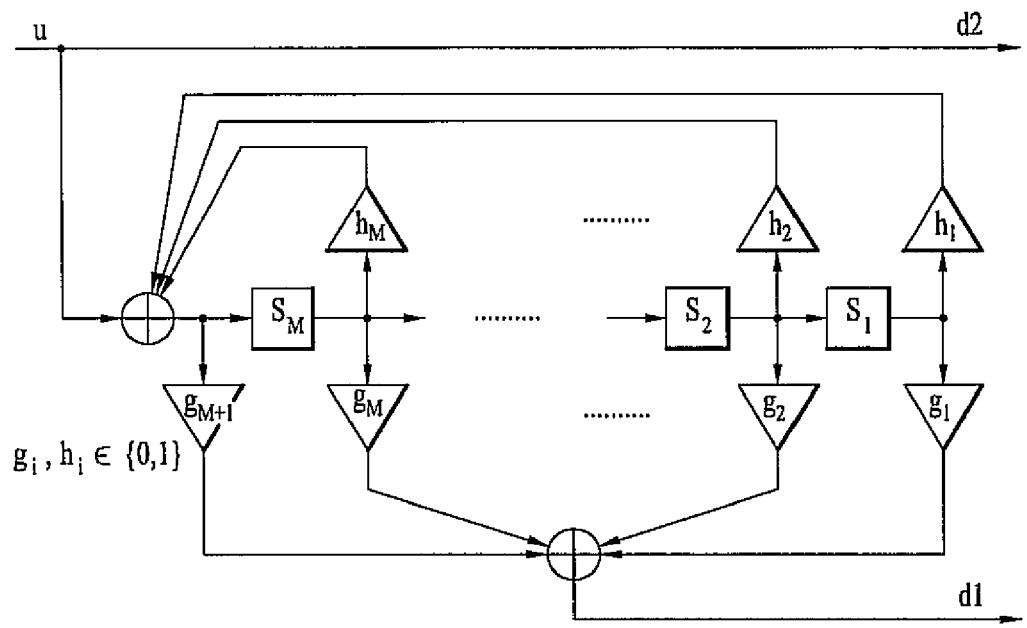
FIG. 8A to FIG. 8C illustrate block views of a systematic convolutional encoder according to another embodiment of the present invention.
Figure 8B:
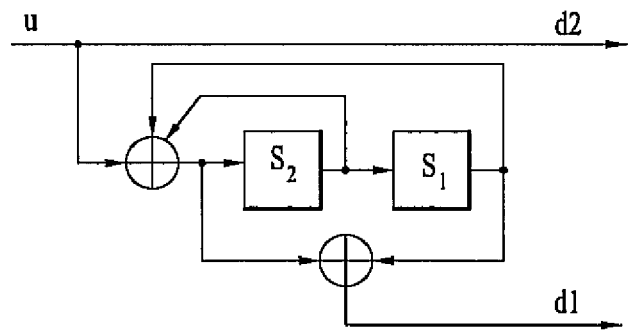
Figure 8C:
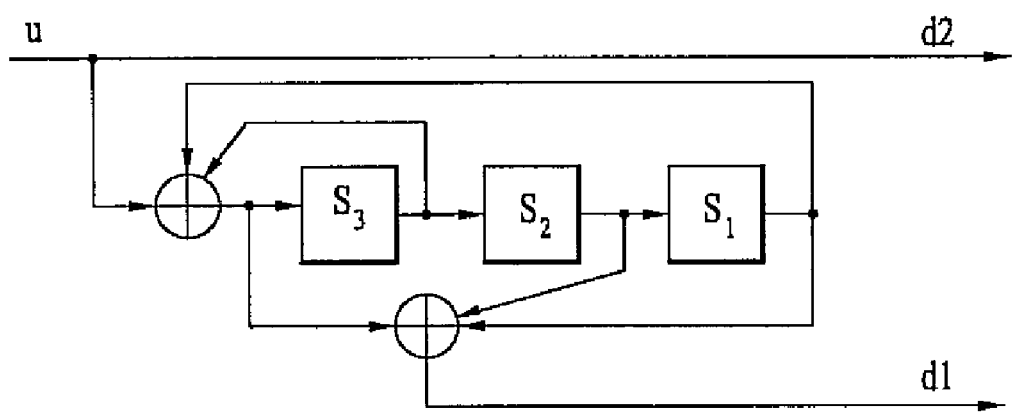

FIG. 8A to FIG. 8C illustrate other different examples of a ½-rate systematic convolutional encoder according to the present invention. The convolutional encoder shown in FIG.

8A to FIG. 8C corresponds to a systematic convolutional encoder which directly outputs the input bit u as the output bit d2 without being changed. More specifically, FIG. 8A illustrates another feedback type ½-rate systematic convolutional encoder having M number of memories. Referring to FIG. 8A, the input of each memory starting from $S_1$ to $S_{M-1}$, corresponds to the value of a previous (left) memory. Meanwhile, in case of the memory $S_M$, the output of each memory starting from $S_1$ to $S_{M-1}$ respectively passes through each multiplier $h_1$ to $h_M$, which are then inputted after being modulo added with the input bit u. In addition, the output of each memory $S_1$ to $S_M$ and the input of the memory $S_M$ pass through each multiplier $g_1$ to $g_{M+1}$, which are outputted as the output bit d1 after being modulo added. The characteristic of the convolutional encoder of FIG. 8A is that the output of each memory $S_1$ to $S_M$ may be fed-back and added to the input of the memory $S_M$.

FIG. 8B illustrates an example of the ½-rate systematic convolutional encoder of FIG. 8A having two memories. Herein, FIG. 8B is equivalent to when only the coefficients of the multipliers $g_1$, $g_3$, $h_1$, and $h_2$ of FIG. 8A are equal to '1', and when the coefficients of the remaining multipliers are equal to '0'. Furthermore, FIG. 8C illustrates an example of the ½-rate systematic convolutional encoder of FIG. 8A having three memories. Herein, FIG. 8C is equivalent to when only the coefficients of the multipliers $g_1$, $g_2$, $g_4$, $h_1$, and $h_3$ of FIG. 8A are equal to '1' and when the coefficients of the remaining multipliers are equal to '0'.

Figure 9A:
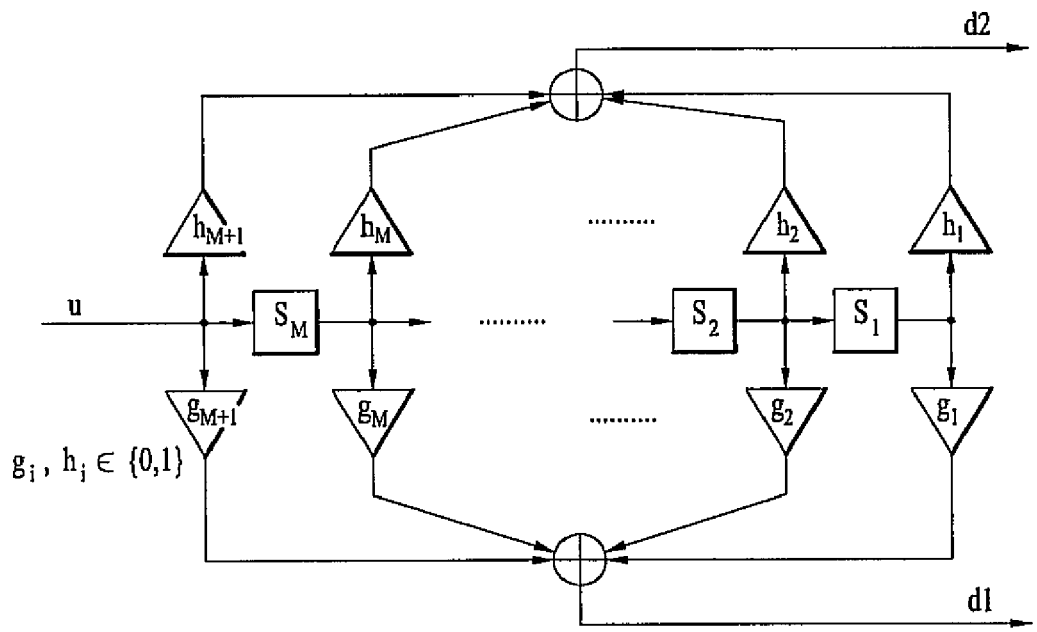
FIG. 9A to FIG. 9C illustrate block views of a non-systematic convolutional encoder according to an embodiment of the present invention.
Figure 9B:
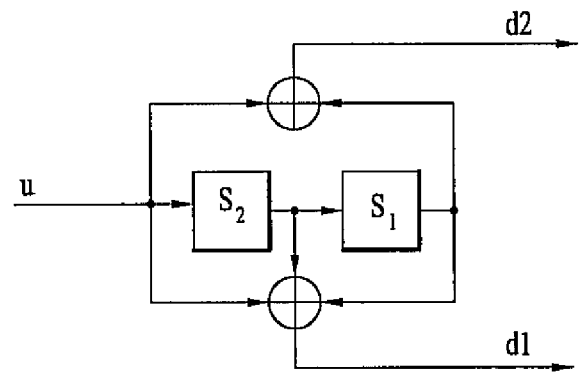
Figure 9C:
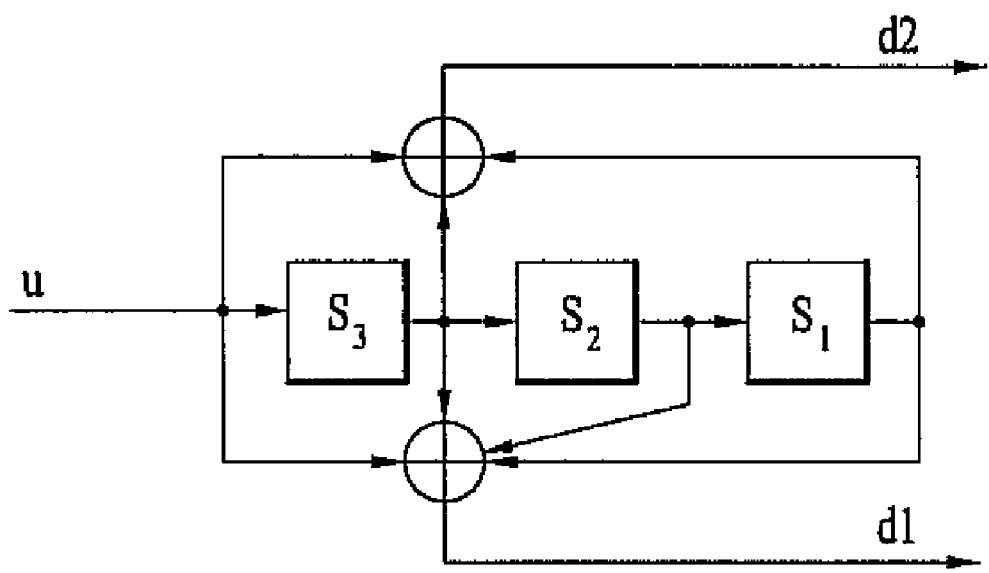

FIG. 9A to FIG. 9C illustrate examples of a ½-rate non-systematic convolutional encoder according to the present invention. The convolutional encoder shown in FIG. 9A to 9C corresponds to a non-systematic convolutional encoder, wherein the input bit u is encoded and outputted as two output bits d1 and d2. FIG. 9A illustrates a type of ½-rate non-systematic convolutional encoder having M number of memories. Referring to FIG. 9A, the input bit u is shifted to each memory $S_M$ to $S_1$. More specifically, the input bit is inputted to the memory $S_M$. Then, the output of the memory $S_M$ is inputted in turn to the memory $S_{M-1}$. Accordingly, the output of each memory is inputted to the each subsequent (or next) memory. Furthermore, when the input bit u and the output bit of each memory $S_M$ to $S_1$ passes through each multiplier $h_{M+1}$ to $h_1$, and is then outputted after being modulo added, the added value becomes the output lower bit d1.

FIG. 9B illustrates an example of the ½-rate non-systematic convolutional encoder of FIG. 9A having two memories. Herein, FIG. 9B is equivalent to when only the coefficients of the multipliers $g_1$, $g_2$, $g_3$, $h_1$ and $h_3$ of FIG. 9A are equal to '1', and when the coefficients of the remaining multipliers are equal to '0'. Furthermore, FIG. 9C illustrates an example of the ½-rate non-systematic convolutional encoder of FIG. 9A having three memories. Herein, FIG. 9C is equivalent to when only the coefficients of the multipliers $g_1$ to $g_4$, $h_1$, $h_3$, and $h_4$ of FIG. 9A are equal to '1', and when the coefficients of the remaining multipliers are equal to '0'.

Figure 10A:
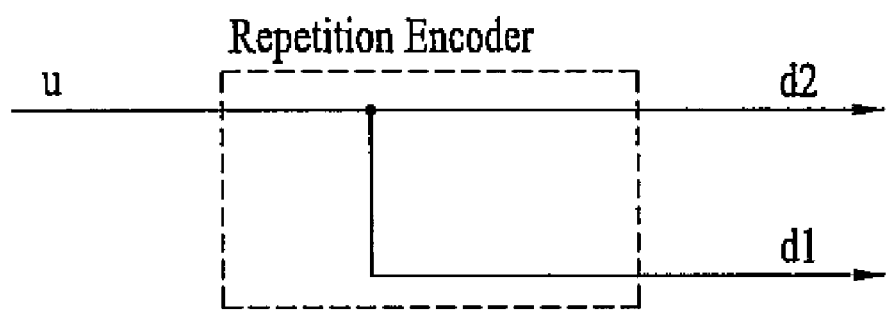
FIG. 10A and FIG. 10B illustrate block views of a ½-rate encoder according to different embodiments of the present invention.
Figure 10B:
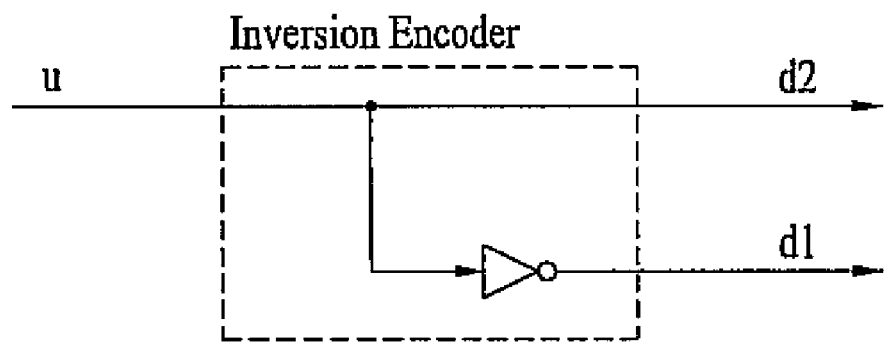

FIG. 10A and FIG. 10B illustrate examples wherein the convolutional encoder is not used as the ½-rate encoder. More specifically, FIG. 10A illustrates an example of a repetition encoder being used as the ½-rate encoder. Herein, the repetition encoder directly outputs the input bit u as two output bits d1 and d2 without any change. Further, FIG. 10B illustrates an example of an inversion encoder being used as the ½-rate encoder. Herein, the inversion encoder directly outputs the input bit u as the output upper bit d2 and, simultaneously, inverses the input bit u so as to be outputted as the output lower bit d1.

As described above, any type of encoder receiving one input bit and outputting the received input bit as two output bits may be used as the ½-rate encoder. Herein, the different types of encoders may include the ½-rate systematic convolutional encoder, the ½-rate non-systematic convolutional encoder, the ½-rate repetition encoder, and the ½-rate inversion encoder. Furthermore, the ½-rate encoder may be used in broader and more diverse applications and is not limited to the above-described examples.

Figure 11:
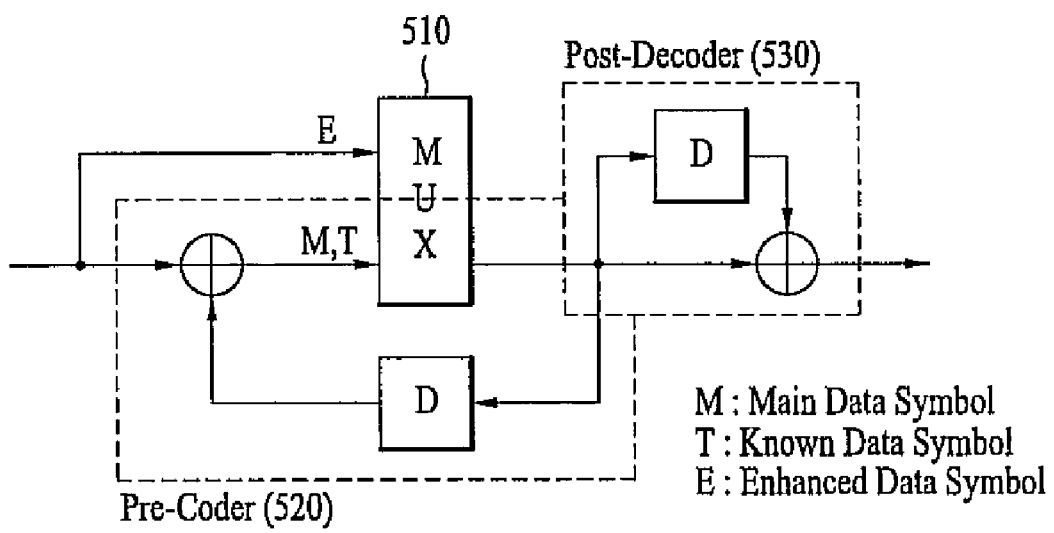
FIG. 11 illustrates a block view of a pre-coder bypass unit according to an embodiment of the present invention.

Hereinafter, the operation of the pre-coder bypass unit will now be described in detail with reference to FIG. 11. FIG. 11 illustrates a block view of the pre-coder bypass unit used in the E-VSB symbol processor of FIGS. 4A and 4B. Referring to FIG. 11, the pre-coder bypass unit according to the present invention includes a multiplexer 510, a pre-coder 520, and a post-decoder 530. Herein, the post-decoder 530 performs an inverse process of the pre-coder 520. The multiplexer 510 selects either an input bit or an output bit of the pre-coder 520 in accordance with the input data symbol type. Then, the multiplexer 510 outputs the selected input bit or output bit to the post-decoder 530. If the input data is an enhanced data symbol, the multiplexer 510 selects the input bit. Conversely, if the input data is one of a known data symbol and a main data symbol, the multiplexer 510 selects the output bit of the pre-coder 520. Thereafter, the selected bit is outputted to the post-decoder 530. Accordingly, the post-decoder 530 post-decodes and outputs the output of the multiplexer 510.

If a main data symbol or a known data symbol is inputted to the pre-coder bypass unit of FIG. 11, the inputted main data symbol sequentially passes through the pre-coder 520 and the post-decoder 530. Therefore, a value equal to that of the input bit is outputted. Accordingly, when the main data or known data symbol pass through the pre-coder included in the trellis encoder, the main data is pre-coded. Meanwhile, when the enhanced data symbol is inputted, the input symbols only pass through the post-decoder 530. This indicates that when the symbols pass through the pre-coder of the trellis encoder, the enhanced data symbol bypasses the pre-coder.

Figure 12A:
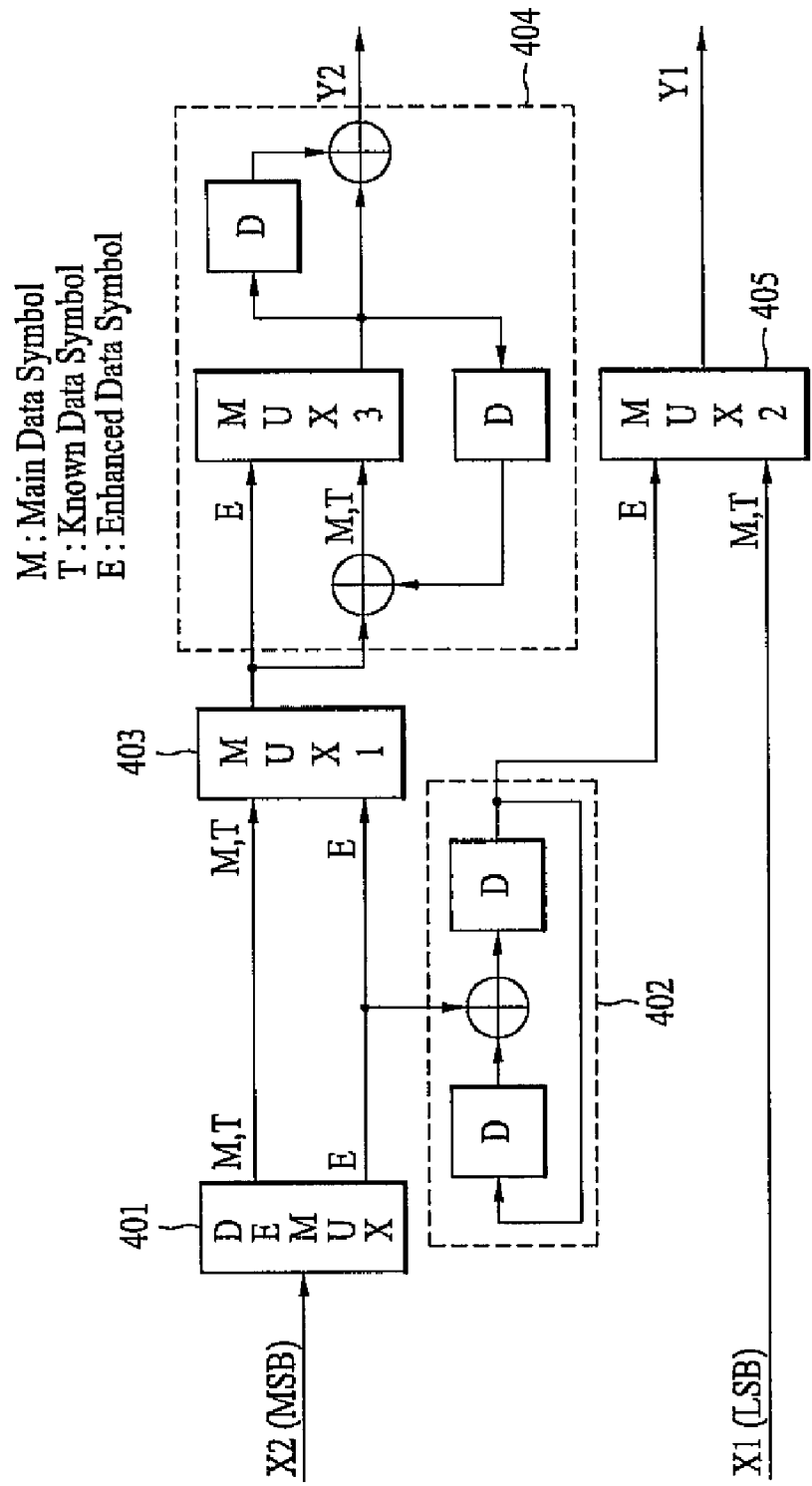
FIG. 12A illustrates an example of the convolutional encoder of FIG. 7B and the pre-coder bypass unit of FIG. 11 being applied to the E-VSB symbol processor of FIG. 4A.
Figure 12B:
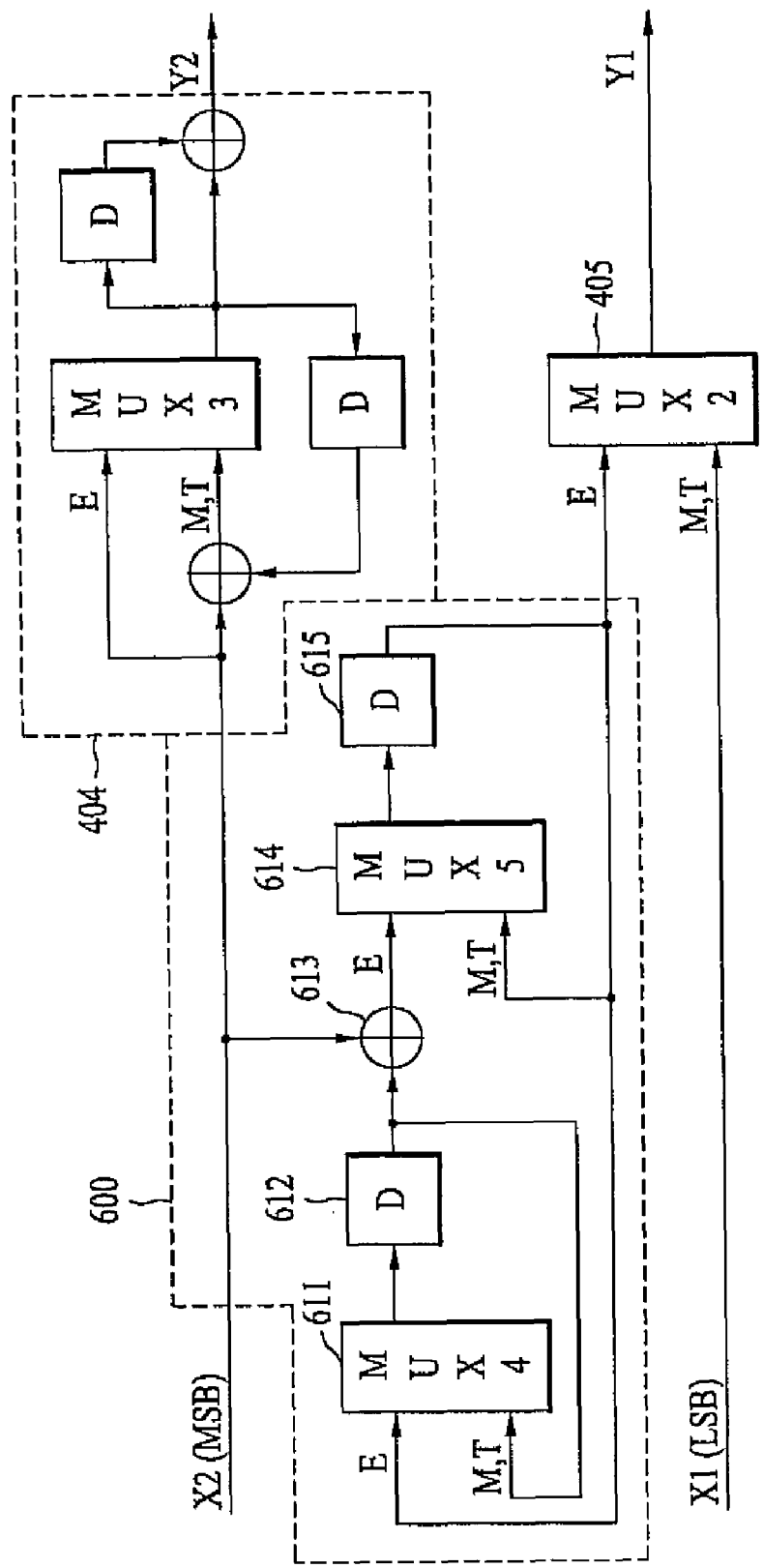
FIG. 12B illustrates an equivalent drawing performing the operations identical to those of FIG. 12A.

FIG. 12A illustrates an example of the convolutional encoder of FIG. 7B and the pre-coder bypass unit of FIG. 11 being applied to the E-VSB symbol processor of FIG. 4A. FIG. 12B illustrates an equivalent drawing of FIG. 12A performing the operations equivalent to those of FIG. 12A. Herein, the demultiplexer 401, ½-rate encoder 402, and the first multiplexer 403 of FIG. 12A are equivalent to the encoder 600 of FIG. 12B, and the operation the above-mentioned components of FIG. 12A is also identical (or equivalent) to the operation of the encoder 600 of FIG. 12B. The encoder 600 of FIG. 12B includes a fourth multiplexer 611, a first delayer 612, an adder 613, a fifth multiplexer 614, and a second delayer 615.

More specifically, when the input data correspond to the enhanced data, the fourth multiplexer 611 selects the first input E and outputs the selected first input E to the first delayer 612. Alternatively, when the input data correspond to one of the main data and the known data, the fourth multiplexer 611 selects the second input M, T and outputs the selected second input M, T to the first delayer 612. The data delayed by one symbol from the first delayer 612 are outputted to the adder 613 and simultaneously fed-back as a first input of the fourth multiplexer 611. The adder 613 adds the input upper bit X2 and the output of the first delayer 612, which are then outputted to the fifth multiplexer 614 as the first input. Herein, when the input data correspond to the enhanced data, the fifth multiplexer 614 selects the output data of the adder 613 and outputs the selected output data to the second delayer 615. Alternatively, when the input data correspond to one of the main data and the known data, the fifth multiplexer 614 selects the fed-back data M, T and outputs the selected data to the second delayer 615. The second delayer 615 delays the input data by one symbol and outputs the delayed data to the second multiplexer 405 and simultaneously feeds back the input data to the fourth multiplexer 611 and the fifth multiplexer 614 as the second input.

If the input data symbol corresponds to the enhanced data symbol, the second multiplexer 405 selects the output of the encoder 600. And, if the input data symbol corresponds to one of the main data symbol and the known data symbol, the second multiplexer 405 selects the lower bit X1 of the input data symbol. Referring to FIG. 12A and FIG. 12B, the main data symbol and the known data symbol are directly bypassed, and only the enhanced data symbol is coded. At this point, the upper bit X2 of the enhanced input symbol is post-decoded and outputted as the output upper bit Y2. Conversely, the lower bit X1 is discarded (or deleted), and, instead of the discarded lower bit X1, the outcome (or output) of the upper bit X2 being convolutional-coded with a ½ coding rate is outputted as the output lower bit Y1.

As described above, the digital broadcasting system, method, and data structure according to the present invention has the following advantages. More specifically, the digital broadcasting system, method, and data structure according to the present invention is highly protected against (or resistant to) any error that may occur when transmitting supplemental data through a channel. And, the present invention is also highly compatible to the conventional VSB receiving system. Moreover, the present invention may also receive the supplemental data without any error even in channels having severe ghost effect and noise.

Additionally, by inserting known data in a specific area of the data area and transmitting the processed data, the receiving performance of the DTV receiver liable to a frequent change in channel may be enhanced. The present invention is even more effective when applied to mobile and portable receivers, which are also liable to a frequent change in channel and which require protection (or resistance) against intense noise. Finally, ½-rate coding is additionally performed on the enhanced data symbol, which bypasses the pre-coder so as to be outputted. Thus, the problems of noise and ghost effect in the channel may be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A DTV transmitter comprising:
a pre-processor pre-processing supplemental data by coding the supplemental data for forward error correction (FEC) and expanding the FEC-coded data;
a multiplexer multiplexing supplemental data packets including the pre-processed supplemental data with main data packets including main data;
a byte-symbol converter converting each data byte of the multiplexed data packets into a symbol;
a symbol processor processing each supplemental data symbol outputted from the byte-symbol converter, the symbol processor encoding an upper bit of the supplemental data symbol into first and second bits, post-decoding the first bit, and outputting the post-decoded first bit and the second bit; and
a symbol-byte converter converting each symbol outputted from the symbol processor into a data byte.

2. The DTV transmitter of claim 1, wherein the symbol processor bypasses each main data symbol outputted from the byte-symbol converter.

3. The DTV transmitter of claim 1, wherein the symbol processor bypasses each symbol corresponding to an MPEG header byte or an RS parity byte added into at least one of the supplemental data packets.

4. The DTV transmitter of claim 1, wherein the symbol processor outputs the post-decoded first bit and the second bit as upper and lower bits of a symbol, respectively.

5. The DTV transmitter of claim 1, wherein the symbol processor comprises:
a ½ rate encoder encoding the upper bit of the supplemental data symbol into the first and second bits and outputting the second bit as a lower bit of a symbol; and
a pre-coder post-decoding the first bit and outputting the post-decoded first bit as a upper bit of a symbol.

6. The DTV transmitter of claim 5, wherein the ½ rate encoder is a systematic convolutional encoder.

7. The DTV transmitter of claim 5, wherein the ½ rate encoder is a non-systematic convolutional encoder.

8. The DTV transmitter of claim 5, wherein the ½ rate encoder is a repetition encoder.

9. The DTV transmitter of claim 1, wherein the pre-processor expands each byte of the FEC-coded data into two bytes.

10. The DTV transmitter of claim 1, wherein the pre-processor expands each byte of the FEC-coded data into four bytes.

11. A DTV transmitter comprising:
a pre-processor pre-processing the supplemental data by coding the supplemental data for forward error correction (FEC) and expanding the FEC-coded data;
a first multiplexer multiplexing supplemental data packets including the pre-processed supplemental data with main data packets including main data;
a byte-symbol converter converting each data byte of the multiplexed data packets into a symbol;
a symbol processor processing each supplemental data symbol outputted from the byte-symbol converter, the symbol processor encoding a lower bit of the supplemental data symbol into first and second bits, post-decoding the first bit, and outputting the post-decoded first bit and the second bit; and
a symbol-byte converter converting each symbol outputted from the symbol processor into a data byte.

12. The DTV transmitter of claim 11, wherein the symbol processor bypasses each main data packet outputted from the byte-symbol converter.

13. The DTV transmitter of claim 11, wherein the symbol processor bypasses each symbol corresponding to an MPEG header byte or an RS parity byte added into at least one of the supplemental data packets.

14. The DTV transmitter of claim 11, wherein the symbol processor outputs the post-decoded first bit and the second bit as upper and lower bits of a symbol, respectively.

15. The DTV transmitter of claim 11, wherein the symbol processor comprises:
a ½ rate encoder encoding the lower bit of the supplemental data symbol into the first and second bits and outputting the second bit as a lower bit of a symbol; and
a pre-coder post-decoding the first bit and outputting the post-decoded first bit as a upper bit of a symbol.

16. The DTV transmitter of claim 15, wherein the ½ rate encoder is a systematic convolutional encoder.

17. The DTV transmitter of claim 15, wherein the ½ rate encoder is a non-systematic convolutional encoder.

18. The DTV transmitter of claim 15, wherein the ½ rate encoder is a repetition encoder.

19. The DTV transmitter of claim 11, wherein the pre-processor expands each byte of the FEC-coded data into two bytes.

20. The DTV transmitter of claim 11, wherein the pre-processor expands each byte of the FEC-coded data into four bytes.

21. A DTV transmitter comprising:
a pre-processor pre-processing the supplemental data by coding the supplemental data for forward error correction (FEC) and expanding the FEC-coded data;
a first multiplexer multiplexing supplemental data packets including the pre-processed supplemental data with main data packets including main data;
a byte-symbol converter converting each data byte of the multiplexed data packets into a symbol;
a known data generator generating known data sequences;
a second multiplexer multiplexing the known data sequences and the symbols outputted from the byte-symbol converter;
a symbol processor processing each supplemental data symbol outputted from the second multiplexer, the symbol processor encoding an upper bit of the supplemental data symbol into first and second bits, post-decoding the first bit, and outputting the post-decoded first bit and the second bit; and
a symbol-byte converter converting each symbol outputted from the symbol processor into a data byte.

22. A DTV transmitter comprising:
a pre-processor pre-processing the supplemental data by coding the supplemental data for forward error correction (FEC) and expanding the FEC-coded data;
a first multiplexer multiplexing supplemental data packets including the pre-processed supplemental data with main data packets including main data;
a byte-symbol converter converting each data byte of the multiplexed data packets into a symbol;
a known data generator generating known data sequences;
a second multiplexer multiplexing the known data sequences and the symbols outputted from the byte-symbol converter;
a symbol processor processing each supplemental data symbol outputted from the second multiplexer, the symbol processor encoding a lower bit of the supplemental data symbol into first and second bits, post-decoding the first bit, and outputting the post-decoded first bit and the second bit; and
a symbol-byte converter converting each symbol outputted from the symbol processor into a data byte.

23. A method of coding data in a digital television (DTV) receiver, the method comprising:
pre-processing supplemental data by coding the supplemental data for forward error correction (FEC) and expanding the FEC-coded data;
multiplexing supplemental data packets including the pre-processed supplemental data with main data packets including main data;
converting each data byte of the multiplexed data packets into a symbol;
processing each supplemental data symbol by encoding an upper bit of the supplemental data symbol into first and second bits, post-decoding the first bit, and outputting the post-decoded first bit and the second bit as a symbol; and
converting each processed supplemental data symbol into a data byte.

24. The method of claim 23, further comprising bypassing each main data symbol.

25. The method of claim 23, further comprising bypassing each symbol corresponding to an MPEG header byte or an RS parity byte added into at least one of the supplemental data packets.

26. The method of claim 23, wherein outputting the post-decoded first bit and the second bit as a symbol comprises outputting the post-decoded first bit and the second bit as upper and lower bits of a symbol, respectively.

27. The method of claim 23, wherein the upper bit of the supplemental data is encoded with a systematic convolutional encoder.

28. The method of claim 23, wherein the upper bit of the supplemental data is encoded with a non-systematic convolutional encoder.

29. The method of claim 23, wherein the upper bit of the supplemental data is encoded with a repetition encoder.

30. A method of coding data in a digital television (DTV) receiver, the method comprising:
pre-processing supplemental data by coding the supplemental data for forward error correction (FEC) and expanding the FEC-coded data;
multiplexing supplemental data packets including the pre-processed supplemental data with main data packets including main data;
converting each data byte of the multiplexed data packets into a symbol;
processing each supplemental data symbol by encoding a lower bit of the supplemental data symbol into first and second bits, post-decoding the first bit, and outputting the post-decoded first bit and the second bit as a symbol; and
converting each processed supplemental data symbol into a data byte.

31. The method of claim 30, wherein outputting the post-decoded first bit and the second bit as a symbol comprises outputting the post-decoded first bit and the second bit as upper and lower bits of a symbol, respectively.

32. The method of claim 30, wherein the lower bit of the supplemental data is encoded with a systematic convolutional encoder.

33. The method of claim 30, wherein the lower bit of the supplemental data is encoded with a non-systematic convolutional encoder.

34. The method of claim 30, wherein the lower bit of the supplemental data is encoded with a repetition encoder.

35. A broadcast transmitter for processing digital broadcast data, the broadcast transmitter comprising:
a generator for generating a broadcast signal having mobile data and main data with 20-byte parity data, respectively; and
a transmitting unit for transmitting the broadcast signal to one or more broadcast receivers, wherein the generator comprises:
an encoder for encoding the mobile data for first error correction;
a convolutional encoder for convolutional encoding the encoded mobile data, the convolutional encoder outputting 2 bits from a first bit of the encoded mobile data, wherein the first bit of the encoded mobile data is input to a modulo adder, an output bit of the modulo adder is input to a first memory, an output bit of the first memory is input to a second memory, and an output bit of the second memory is input to the modulo adder; and a trellis encoder for trellis encoding the convolutional-encoded mobile data including the first bit of the encoded mobile data and the output bit of the first memory.

36. A method of processing digital broadcast data in a broadcast transmitter, the method comprising:
generating a broadcast signal having mobile data and main data with 20-byte parity data, respectively; and
transmitting the broadcast signal to one or more broadcast receivers, wherein generating a broadcast signal comprises:
encoding the mobile data for first error correction;
convolutional encoding the encoded mobile data to output 2 bits from a first bit of the encoded mobile data, wherein the first bit of the encoded mobile data is input to a modulo adder, an output bit of the modulo adder is input to a first memory, an output bit of the first memory is input to a second memory, and an output bit of the second memory is input to the modulo adder; and
trellis encoding the convolutional-encoded mobile data including the first bit of the encoded mobile data and the output bit of the first memory.

37. A method of processing digital broadcast data in a broadcast receiver, the method comprising:
receiving a broadcast signal including mobile data and main data with 20-byte parity data, respectively; and
decoding the received broadcast signal, wherein the broadcast signal is generated in a broadcast transmitter by:
encoding mobile data for first error correction;
convolutional encoding the encoded mobile data to output 2 bits from a first bit of the encoded mobile data, wherein the first bit of the encoded mobile data is input to a modulo adder, an output bit of the modulo adder is input to a first memory, an output bit of the first memory is input to a second memory, and an output bit of the second memory is input to the modulo adder; and
trellis encoding the convolutional-encoded mobile data including the first bit of the encoded mobile data and the output bit of the first memory.

38. A broadcast receiver for processing digital broadcast data, the broadcast receiver comprising:
a tuner for receiving a broadcast signal including mobile data and main data with 20-byte parity data, respectively; and
a decoder for decoding the received broadcast signal, wherein the broadcast signal is generated in a broadcast transmitter by:
encoding mobile data for first error correction;
convolutional encoding the encoded mobile data to output 2 bits from a first bit of the encoded mobile data, wherein the first bit of the encoded mobile data is input to a first modulo adder, an output bit of the modulo adder is input to a first memory, an output bit of the first memory is input to a second memory, and an output bit of the second memory is input to the modulo adder; and
trellis encoding the convolutional-encoded mobile data including the first bit of the encoded mobile data and the output bit of the first memory.

* * * * *